US007683893B2

(12) United States Patent
Kim (10) Patent No.: US 7,683,893 B2
(45) Date of Patent: Mar. 23, 2010

(54) CONTROLLING DISPLAY IN MOBILE TERMINAL

(75) Inventor: Tae Hun Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 11/739,002

(22) Filed: Apr. 23, 2007

(65) Prior Publication Data

US 2008/0176528 A1 Jul. 24, 2008

(30) Foreign Application Priority Data

Jan. 20, 2007 (KR) .................... 10-2007-0006384

(51) Int. Cl.
*G09G 5/00* (2006.01)
(52) U.S. Cl. .................... 345/173; 178/18.01
(58) Field of Classification Search ............. 345/156, 345/168, 169, 173; 455/566
See application file for complete search history.

(56) References Cited

U.S. PATENT DOCUMENTS

| 5,757,359 | A | * | 5/1998 | Morimoto et al. ........... 345/156 |
|---|---|---|---|---|
| 5,977,970 | A | * | 11/1999 | Amro et al. ................. 715/857 |
| 6,040,824 | A | * | 3/2000 | Maekawa et al. ........... 345/173 |
| 6,091,956 | A | * | 7/2000 | Hollenberg ............. 455/456.5 |
| 6,202,026 | B1 | * | 3/2001 | Nimura et al. ............. 701/211 |
| 6,414,672 | B2 | * | 7/2002 | Rekimoto et al. .......... 345/173 |
| 6,687,614 | B2 | * | 2/2004 | Ihara et al. ................. 701/209 |
| 7,002,556 | B2 | * | 2/2006 | Tsukada et al. ............. 345/173 |
| 2003/0214532 | A1 | * | 11/2003 | Nakamura ................. 345/764 |
| 2004/0098195 | A1 | * | 5/2004 | Listle et al. ................ 701/211 |
| 2005/0012723 | A1 | * | 1/2005 | Pallakoff .................... 345/173 |
| 2005/0024238 | A1 | * | 2/2005 | Kimura .................... 340/995.1 |
| 2005/0267676 | A1 | * | 12/2005 | Nezu et al. .................. 701/200 |
| 2007/0057926 | A1 | * | 3/2007 | Ohzawa et al. ............. 345/173 |
| 2007/0109323 | A1 | * | 5/2007 | Nakashima ................ 345/661 |
| 2007/0126698 | A1 | * | 6/2007 | Iwamoto et al. ............ 345/156 |
| 2007/0146342 | A1 | * | 6/2007 | Medler et al. .............. 345/173 |

FOREIGN PATENT DOCUMENTS

| EP | 0651543 | A | | 5/1995 |
|---|---|---|---|---|
| JP | 09027050 | A | * | 1/1997 |
| JP | 2005-092441 | A | | 9/2003 |
| WO | WO 99/28812 | A | | 6/1999 |
| WO | WO 02/082418 | | | 10/2002 |

OTHER PUBLICATIONS

Jeffrey Mincey: "Did Apple Steal the iPhone Design From LG?" Jan. 16, 2007, XP002481753 Retrieved from the Internet: URL: http://mac360.com/index.php/macc360/comments/did_apple_steal_the_iphone_design_from_Ig/>[retrieved on May 26, 2008].

* cited by examiner

*Primary Examiner*—Amr Awad
*Assistant Examiner*—Stephen G Sherman
(74) *Attorney, Agent, or Firm*—Lee, Hong, Degerman, Kang & Waimey (57) ABSTRACT

The present invention relates to controlling a display in a mobile terminal including a touch screen having a display area that operates as a touch input area. The present invention includes displaying data information on the display area, wherein the data information is distinguished with graphic icons, and displaying a frame on the display area to at least partially overlap the data information and defining a first area within the frame and a second area outside of the frame to define the data information into at least two parts, wherein when at least one of the first area and a frame boundary is touched, a predetermined function associated with the data information displayed in the first area is performed.

13 Claims, 11 Drawing Sheets

CONTROLLING DISPLAY IN MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2007-006384, filed on Jan. 20, 2007, the contents of which are hereby incorporated by reference herein in their entirety.

FIELD OF THE INVENTION

The present invention relates to a mobile terminal, and more particularly, to controlling a display in a mobile terminal including a touch screen having a display area that operates as a touch input area.

BACKGROUND OF THE INVENTION

As a demand for electronic devices increased, the electronic devices have provided more convenient services and functions for the user. Particularly, interest in electronic devices with a touch screen has become greater.

An electronic device with a touch screen allows a user to directly touch the touch screen to enter a desired menu or information, and therefore offer easy information accessibility. Thus, what is needed is an electronic device, such as a mobile terminal, that utilizes the touch screen to provide the user with better services and functions.

SUMMARY OF THE INVENTION

The present invention is directed to controlling a display in a mobile terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method of controlling display in a mobile terminal comprising a touch screen having a display area that operates as a touch input area, the method comprising displaying data information on the display area, wherein the data information is distinguished with graphic icons, and displaying a frame on the display area to at least partially overlap the data information and defining a first area within the frame and a second area outside of the frame to define the data information into at least two parts, wherein when at least one of the first area and a frame boundary is touched, a predetermined function associated with the data information displayed in the first area is performed.

In one aspect of the invention, the data information comprises a map and the predetermined function comprises displaying detailed location information, wherein the detailed location information is presented on the display area as one of a pop-up window and a shaded image.

In another aspect of the invention, the data information comprises text and the predetermined function comprises displaying a definition of the text, wherein the definition of the text is presented on the display area as one of a pop-up window and a shaded image.

Preferably, the predetermined function comprises enlarging a portion of the data information corresponding to the first area. Preferably, the frame comprises one of a polygon and a circularly closed-loop. Preferably, the frame is defined by touching the display area in a manner that forms substantially a closed-loop. Preferably, the frame is reduced when the second area of the display area is touched.

In a further aspect of the invention, movement of the frame is controlled in response to a touching manner in at least one of the first area and the frame boundary of the display area. Preferably, the frame is displayed in response to a touching of the display area where the data information is displayed.

Preferably, when the second area is touched, the data information corresponding to a touched portion is displayed in the frame. Preferably, the size of the first area is controlled using the graphic icons. Preferably, the frame size is adjusted when the frame boundary is touched and dragged. Alternatively, the frame size is adjusted in response to activation of control keys.

In accordance with another embodiment of the present invention, a mobile terminal capable of controlling a display comprises a touch screen having a display area that operates as a touch input area, and a controller displaying data information on the display area, wherein the data information is distinguished with graphic icons, and displaying a frame on the display area to at least partially overlap the data information and defining a first area within the frame and a second area outside of the frame to define the data information into at least two parts, wherein when at least one of the first area and a frame boundary is touched, a predetermined function associated with the data information displayed in the first area is performed.

In one aspect of the invention, the data information comprises a map and the predetermined function comprises displaying detailed location information, wherein the detailed location information is presented on the display area as one of a pop-up window and a shaded image.

In another aspect of the invention, the data information comprises text and the predetermined function comprises displaying a definition of the text, wherein the definition of the text is presented on the display area as one of a pop-up window and a shaded image.

Preferably, the predetermined function comprises enlarging a portion of the data information corresponding to the first area. Preferably, the frame comprises one of a polygon and a circularly closed-loop. Preferably, the frame is defined by touching the display area in a manner that forms substantially a closed-loop. Preferably, the frame is reduced when the second area of the display area is touched.

In a further aspect of the invention, movement of the frame is controlled in response to a touching manner in at least one of the first area and the frame boundary of the display area. Preferably, the frame is displayed in response to a touching of the display area where the data information is displayed.

Preferably, when the second area is touched, the data information corresponding to a touched portion is displayed in the frame. Preferably, the size of the first area is controlled using the graphic icons. Preferably, the frame size is adjusted when the frame boundary is touched and dragged. Alternatively, the frame size is adjusted in response to activation of control keys.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to controlling a display in a mobile terminal. Hereinafter, embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

The present invention may be applied to various types of electronic devices comprising a touch screen, such as a computer, a personal digital assistant (PDA), and a cellular phone. In accordance with one embodiment of the present invention, a mobile communication terminal having a telecommunication function is used. Notably, although the present invention is described using a touch screen as a touch input device for example, the present invention is not limited thereto. The present invention may be used in conjunction with all types of touch input devices using a touch sensing technique including a touch screen, touch pad and the like.

Figure 1:
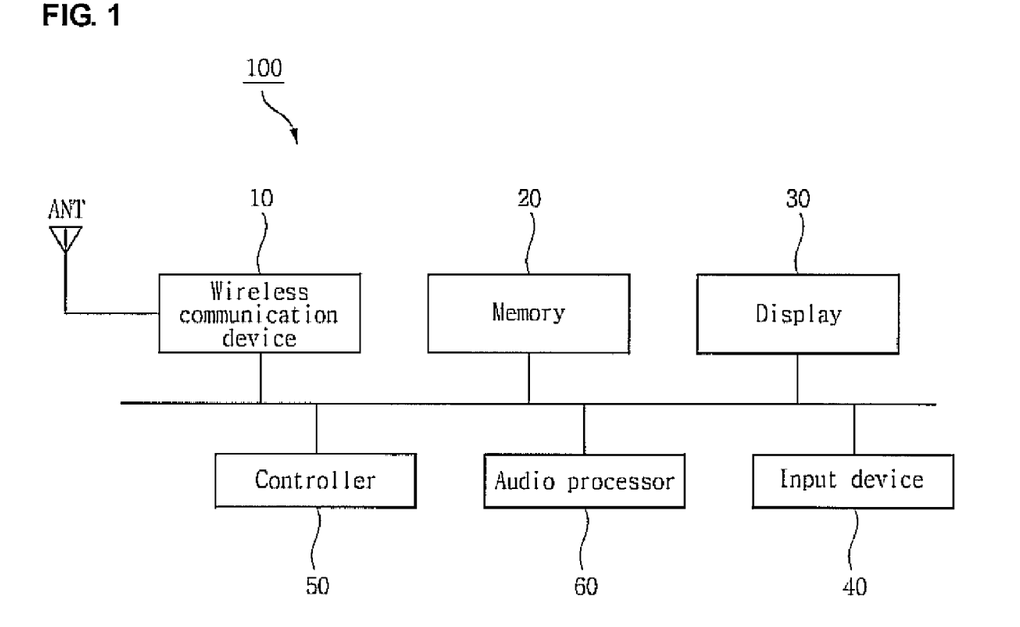
FIG. 1 is a block diagram of a mobile terminal in accordance with one embodiment of the present invention.

FIG. 1 is a block diagram of a mobile terminal in accordance with one embodiment of the present invention. Referring to FIG. 1, a mobile terminal 100 comprises a wireless communication device 10, a memory 20, a display 30, an input device 40, a controller 50 and an audio processor 60.

The wireless communication device 10 performs a communication function of the mobile terminal 100. Preferably, the wireless communication device 10 comprises an RF transmitter for transmitting communication signals to a base station and an RF receiver for receiving communication signals from the base station.

The memory 20 includes a program memory and a data memory. The program memory stores programs for controlling general movement of the mobile terminal 100. In accordance with one embodiment of the present invention, the memory 20 stores a subway map, a calendar, a geographic map, and various multimedia files, for example.

The display 30 displays various information or data the user is interested in according to the control of controller 50. The display 30 may be one of a liquid crystal display (LCD) and an organic light emitting diode (OLED), for example. In addition, the display 30 may comprise two displays such as an outside display and an inside display. Preferably, the display 30 is implemented with a touch screen, which may function as an input apparatus for receiving user instructions while simultaneously displaying various data.

The input device 40 functions as an interface allowing a user to provide instructions to the controller 50. Preferably, the input device 40 comprises various side keys and navigation keys on the mobile terminal 100. Preferably, the side keys comprise up/down side keys, which may be used to increase and decrease the size of the data and/or the frame displayed on the display 30. The controller 50 implements general control of the mobile terminal 100 according to the present invention.

When a request for displaying predetermined data is made by the user, the controller 50 displays the data on the touch screen 30. Preferably, the controller 50 controls a frame including a predetermined region or domain displayed on the touch screen 30 in order to retrieve information related to the specific data displayed on the touch screen 30. Thus, when an inner portion of the region is touched by the user's finger or a stylus pen, the controller 50 displays the information related to the inner portion of the region on the touch screen 30.

The audio processor 60 outputs an audio signal decoded by the controller 30 through a loud speaker (SPK). The audio processor 60 also transfers an audio signal generated through a microphone (MIC) to the controller 30.

Figure 2:
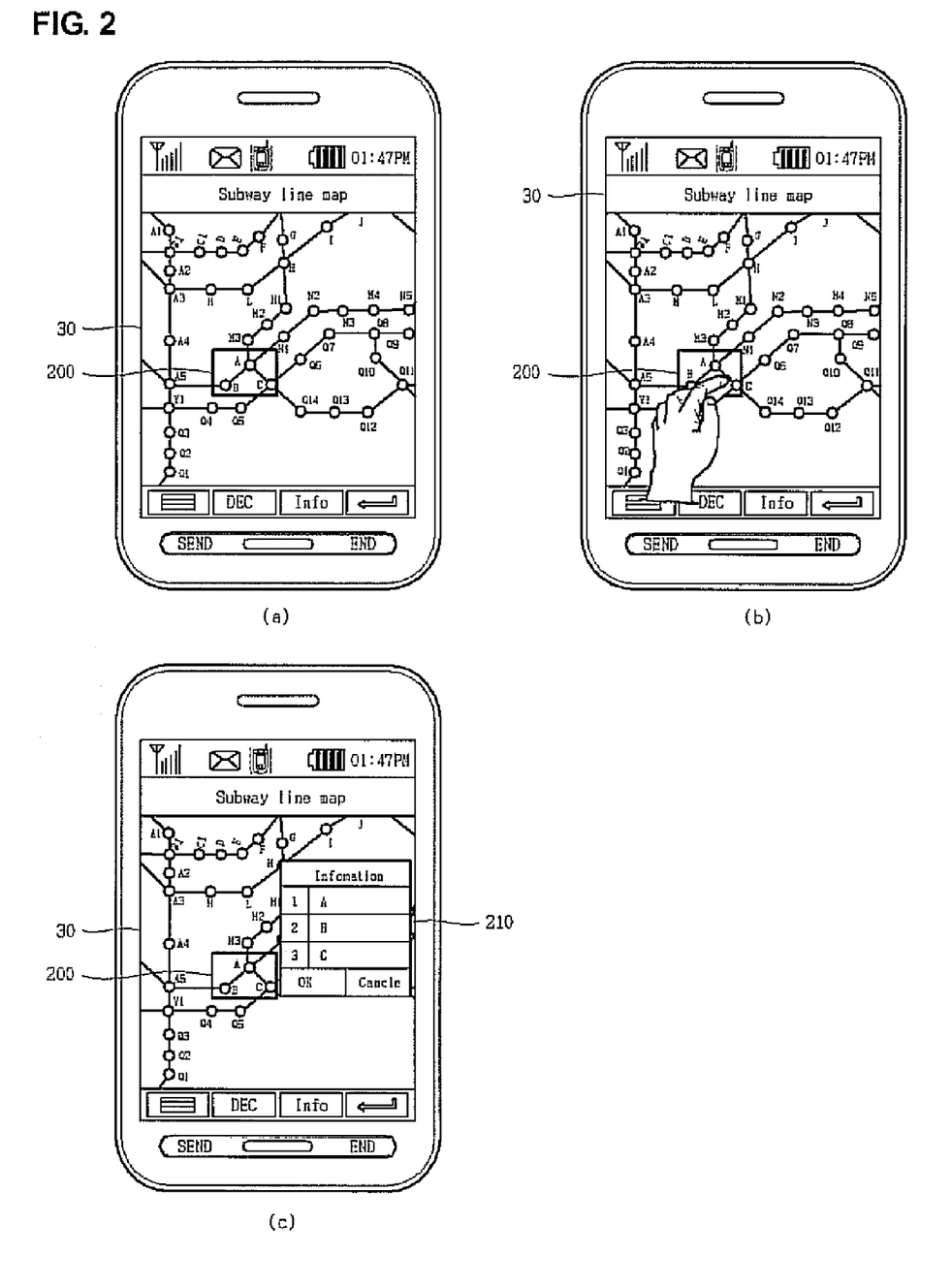
FIGS. 2(a)-2(c) are drawings for explaining an information display method of a mobile terminal in accordance with one embodiment of the present invention.

In accordance with one embodiment of the present invention, the present invention searches for information related to data displayed on an inner portion of a frame of a touch screen. FIGS. 2(a)-2(c) are drawings for explaining an information display method of a mobile terminal in accordance with one embodiment of the present invention.

As shown in FIG. 2(a), if a display of a subway line map is requested by the user, the subway line map and a frame 200 including a specific region or domain are displayed on the touch screen 30 of the mobile terminal 100. Although the frame 200 is drawn with a quadrangle shape in FIG. 2(a), other frame shapes may be used. For example, the shape of the frame 200 may be a circle, a polygon or a closed shape. Moreover, the boundary line of the frame 200 may be a dotted line or a solid line, for example.

Referring to FIG. 2(b), when the user touches the inner region of the displayed frame 200 on the touch screen 30, information related to a subway station located inside the touched frame 200 is displayed on the touch screen 30 in the form of a pop-up window 210, as shown in FIG. 2(c). The information related to the subway station may comprise the name of the subway station and other information related to subway lines passing through the subway station. Preferably, the pop-up window 210 including the information related to the subway station is displayed near the frame 200. Although the pop-up window 210 is displayed to the right of the frame 200 in FIG. 2(c), the present invention is not limited thereto. The pop-up window may be displayed anywhere near the frame 200 in any direction.

Moreover, although the frame 200 is displayed near the center of the touch screen 30 in the figures, the location of the frame 200 is not limited thereto. The location of the frame 200 may be changed via user touch or interaction.

Furthermore, although the data displayed on the touch screen 30 is subway line map information by example, the present invention is not limited thereto. The displayed data may be one of a bus line map, a train line map, a geographic map, a calendar, a webpage, an electronic book (e-book) and others.

As described above, the above embodiment is advantageous in that the user can watch or confirm the information related to the data displayed inside the frame by touching the inner portion of the frame on the screen 30.

In accordance with another embodiment of the present invention, the present invention relates to transferring data displayed on a touch screen. FIGS. 3(a)-3(d) are drawings for explaining an information display method of a mobile terminal in accordance with another embodiment of the present invention.

Figure 3:
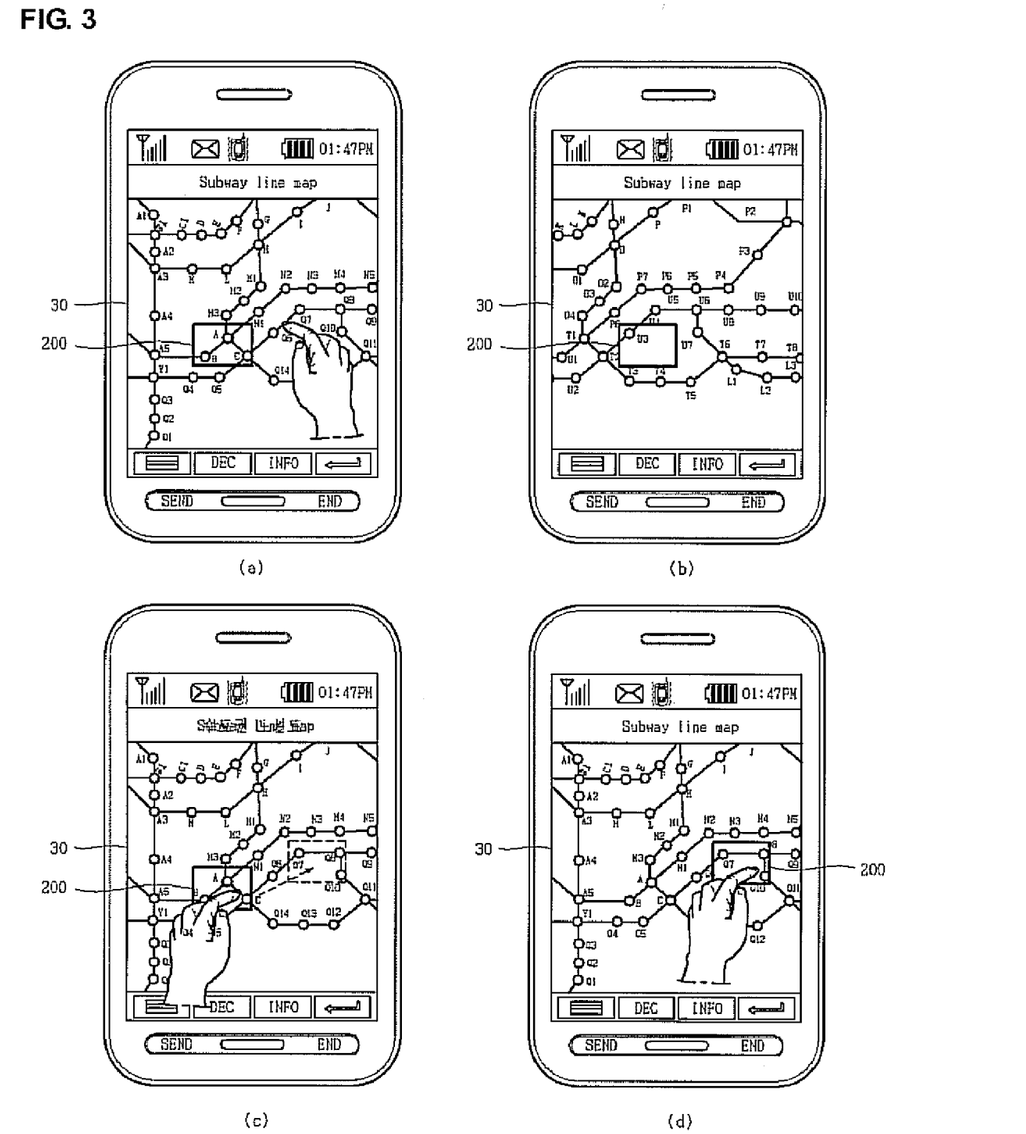
FIGS. 3(a)-3(d) are drawings for explaining an information display method of a mobile terminal in accordance with another embodiment of the present invention.

Referring to FIG. 3(a), if a display of a subway line map is requested by the user, the subway line map and the frame 200 including a specific region or domain are displayed on the touch screen 30 of the mobile terminal 100. Although the frame 200 is drawn with a quadrangle shape in FIG. 3(a), other frame shapes may be used. For example, the shape of the frame 200 may be a circle, a polygon or a closed shape. Moreover, the boundary line of the frame 200 may be a dotted line or a solid line, for example.

Referring to FIGS. 3(b) and 3(c), when the user touches a portion of the touch screen 30 outside of the frame 200, the subway line map moves on the touch screen 30 such that a point of the subway line map touched by the user is relocated to the inside of the frame 200. In other words, when the user touches a point on the map that is outwardly above, below, left or right of the frame 200, the subway line map respectively moves up, down, left or right on the touch screen 30 so that the point touched by the user is located inside the frame 200.

As described above, the frame 200 is located at a specific location, such as the center of the touch screen 30. However, the present invention is not limited thereto. Thus, if the frame 200 is not located at the center of the touch screen 30, when a portion of the screen 30 located outside of the frame 200 is touch by the user, the touched point on the subway line map may be relocated to the inside of the frame 200 and moved to the center of the touch screen 30.

Thus, according to the above embodiments, the user is able to move a subway station the user is interested in to the inside of the frame 200. By doing so, the user emphasizes the station's pertinence and is able to obtain more relevant information related to the subway station.

In accordance with a further embodiment of the present invention, the present invention increases and/or decreases a size of a frame displayed on a touch screen. FIGS. 4(a)-4(e) are drawings for explaining an information display method of a mobile terminal in accordance with a further embodiment of the present invention.

Figure 4:
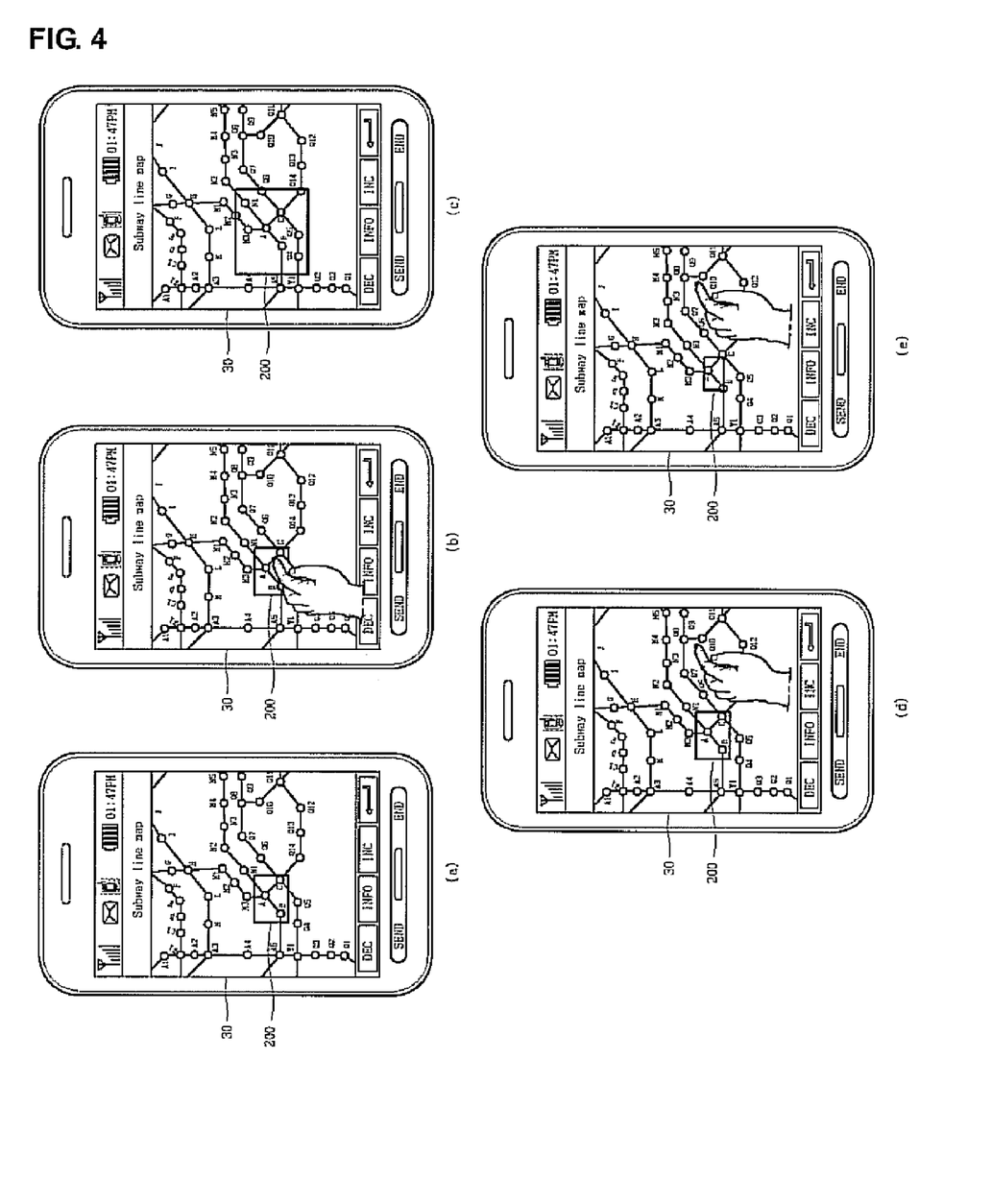
FIGS. 4(a)-4(e) are drawings for explaining an information display method of a mobile terminal in accordance with a further embodiment of the present invention.

Referring to FIG. 4(a), if a subway line map display is requested by the user to search a subway line, the subway line map and the frame 200 including a predetermined region or domain are displayed on the touch screen 30 of the mobile terminal 100.

Although the frame 200 is drawn with a quadrangle shape in FIG. 4(a), the frame 200 is not limited thereto and may have various shapes. For example, the shape of the frame 200 may be a circle, a polygon or a closed shape. Moreover, the boundary line of the frame 200 may be a dotted line or a solid line, for example.

Referring to FIGS. 4(b) and 4(c), when the user touches an inner portion of the frame 200, the size of the displayed frame 200 increases on the touch screen 30. Referring to FIGS. 4(d) and 4(e), when the user touches a portion of the touch screen 30 outside of the frame 200, the size of the displayed frame 200 decreases on the touch screen 30. Notably, the present invention may be alternatively implemented such that when the user touches the inner portion of the frame 200, the size of the displayed frame 200 decreases on the touch screen 30 and when the user touches the portion of the touch screen 30 outside of the frame 200, the size of the displayed frame 200 increases on the touch screen 30.

Figure 5:
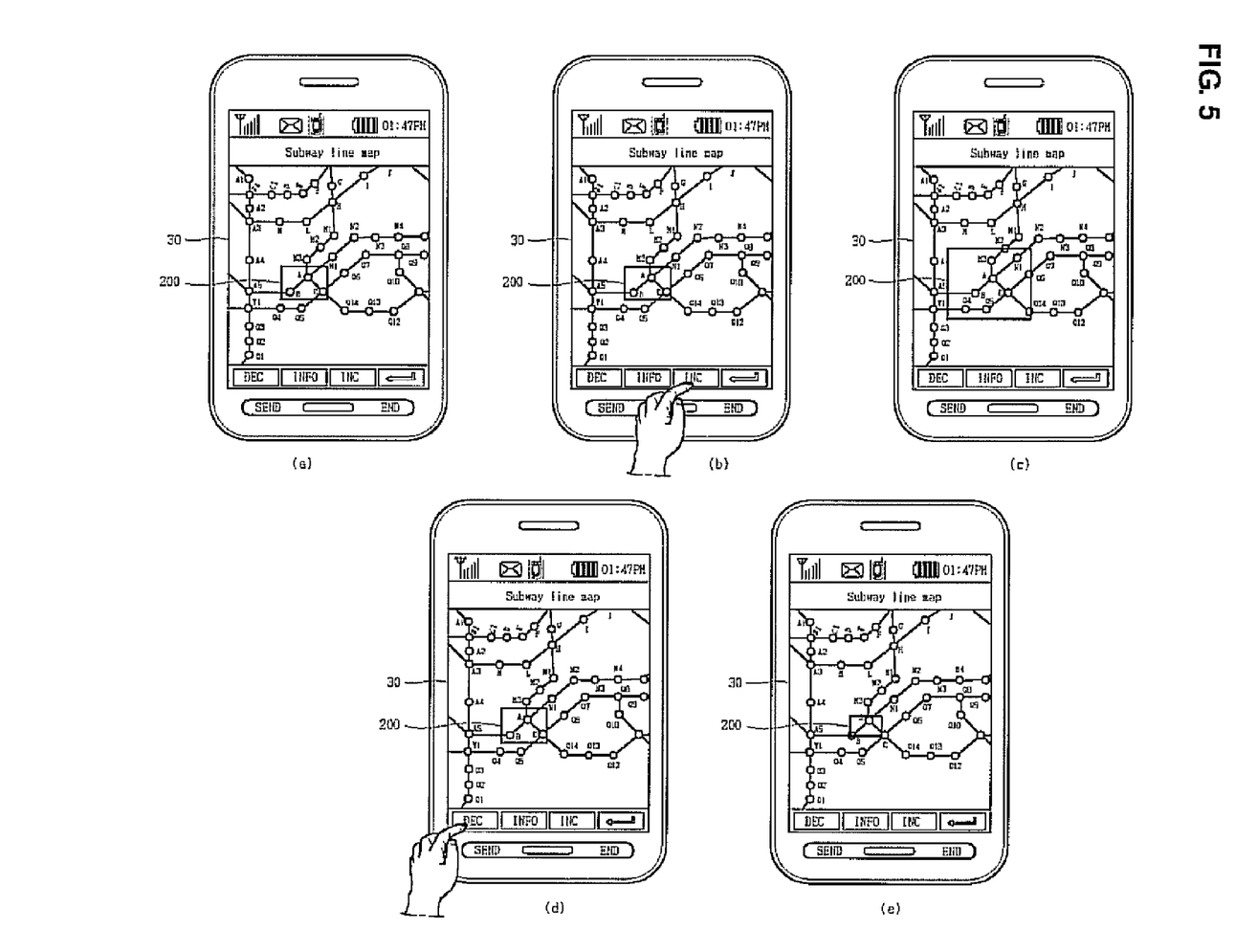
FIGS. 5(a)-5(e) illustrate increasing or decreasing a size of a frame using scale up/down menus displayed on a touch screen in accordance with one embodiment of the present invention.

FIGS. 5(a)-5(e) illustrate increasing or decreasing a size of a frame using scale up/down menus displayed on a touch screen in accordance with one embodiment of the present invention. Referring to FIG. 5(a), menus for increasing and decreasing a frame size, the subway line map and the frame 200 are displayed on the touch screen 30. Referring to FIGS. 5(b) and 5(c), when the user touches the menu for increasing the frame size on the touch screen 30, the size of the displayed frame 200 increases on the touch screen 30. Referring to FIGS. 5(d) and 5(e), when the user touches the menu for decreasing the frame size on the touch screen 30, the size of the displayed frame 200 decreases on the touch screen 30.

Figure 6:
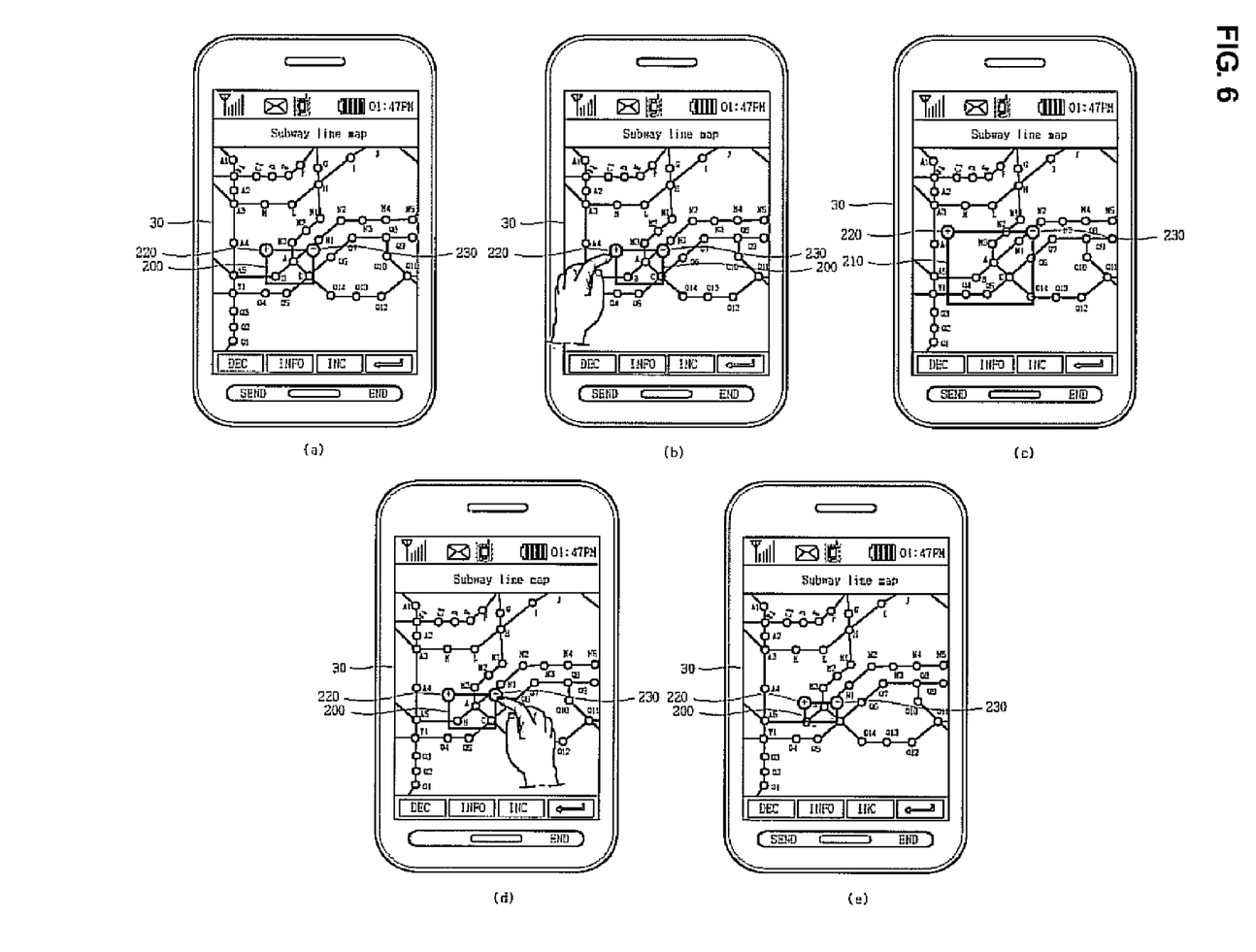
FIGS. 6(a)-6(e) illustrate increasing or decreasing a size of a frame using scale up/down icons displayed on a touch screen in accordance with one embodiment of the present invention.

FIGS. 6(a)-6(e) illustrate increasing or decreasing a frame size using scale up/down icons displayed on a touch screen in accordance with one embodiment of the present invention. Referring to FIG. 6(a), icons 220 and 230 for respectively increasing and decreasing the frame size, the subway line map and the frame 200 are displayed on the touch screen 30.

Referring to FIGS. 6(b) and 6(c), when the user touches the icon 220 on the touch screen 30, the size of the displayed frame 200 increases on the touch screen 30. Referring to FIGS. 6(d) and 6(e), when the user touches the icon 230 on the touch screen 30, the size of the displayed frame 200 decreases on the touch screen 30.

In accordance with the present invention, when the user outwardly drags a touched position inside the frame 200 to a specific position outside the frame 200 while maintaining the touched state, the size of the displayed frame 200 increases to the dragged position. Furthermore, when the user inwardly drags the touched position inside the frame 200 toward a central position inside the frame 200 while maintaining the touched state, the size of the displayed frame 200 is decreased to the dragged position.

In one aspect of the invention, when the user outwardly drags a touched position on the boundary of the frame 200 to a specific position outside the frame 200 while maintaining the touched state, the size of the displayed frame 200 increases to the dragged position. Similarly, when the user inwardly drags the touched position on the boundary of the frame 200 toward a central position inside the frame 200 while maintaining the touched state, the size of the displayed frame 200 is decreased to the dragged position.

Additionally, the size of the displayed frame 200 may be increased or decreased using up and down side keys located at a side of the mobile terminal 100. For example, when the user presses the up side key, the size of the displayed frame 200 is increased on the screen 30. Accordingly, when the user presses the down side key, the size of the displayed frame 200 decreases on the screen 30.

Thus, because the user is able to increase and decrease the size of the frame 200 by means of the above methods, the user can vary the size of the frame 200 to his/her preference in order to emphasize the most pertinent information.

In accordance with another embodiment of the present invention, the present invention increases and/or decreases a size of data displayed on a touch screen. FIGS. 7(a)-7(e) are drawings for explaining an information display method of a mobile terminal in accordance with another embodiment of the present invention.

Figure 7:
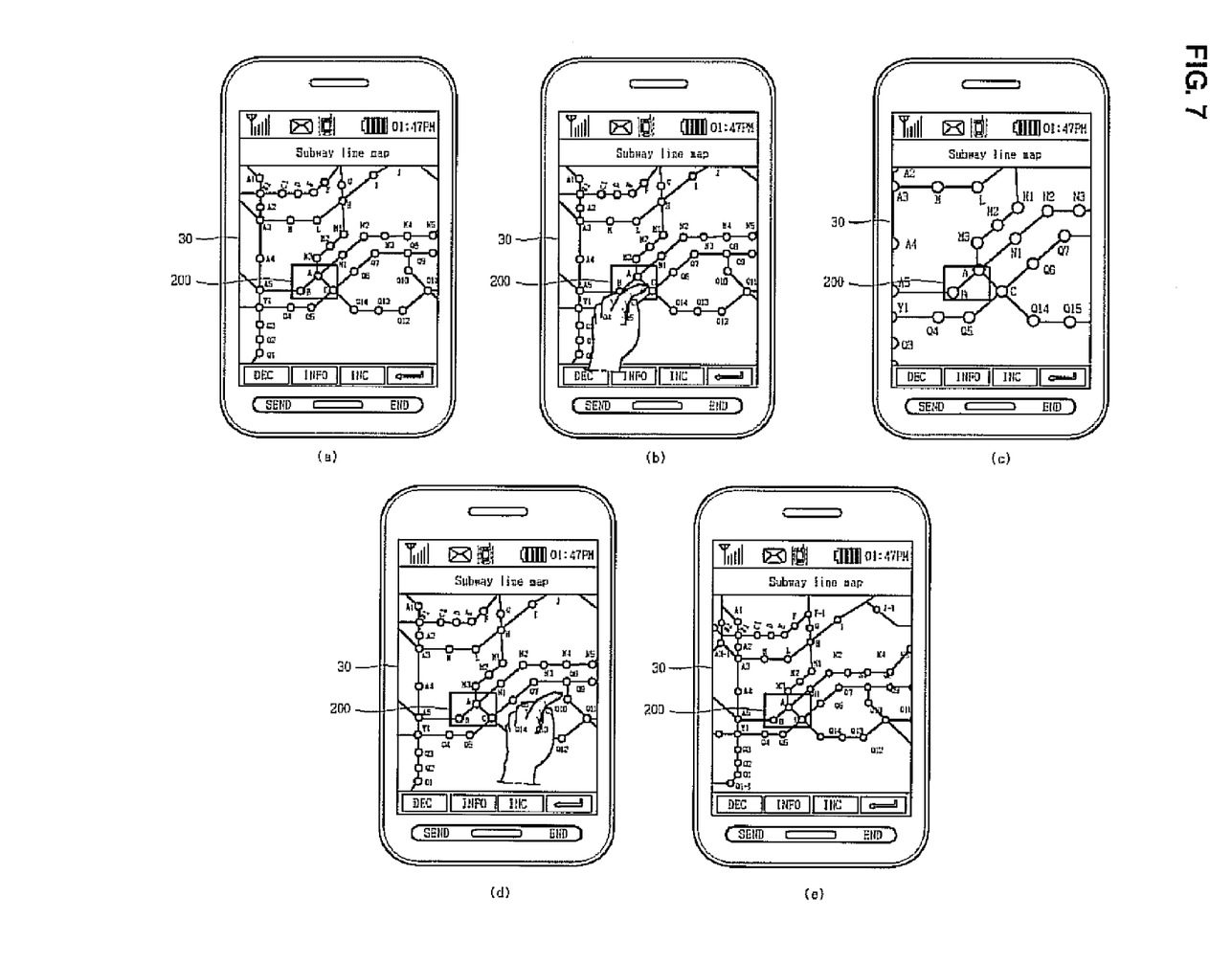
FIGS. 7(a)-7(e) are drawings for explaining an information display method of a mobile terminal in accordance with another embodiment of the present invention.

Referring to FIG. 7(a), if a subway line map display is requested by the user to search a subway line, the subway line map and the frame 200 including a predetermined region or domain are displayed on the touch screen 30 of the mobile terminal 100. Although the frame 200 is drawn with a quadrangle shape in FIG. 7(a), the frame 200 may various shapes. For example, the shape of the frame 200 may be a circle, a polygon or a closed shape. Moreover, the boundary line of the frame 200 may be a dotted line or a solid line, for example.

Referring to FIGS. 7(b) and 7(c), when the user touches an inner portion of the frame 200, the size of the displayed subway line map is increased on the touch screen 30. Referring to FIGS. 7(d) and 7(e), when the user touches a portion of the touch screen 30 outside of the frame 200, the size of the displayed subway line map is decreased on the touch screen 30. Notably, the present invention may be alternatively implemented such that when the user touches the inner portion of the frame 200, the size of the displayed subway line map decreases on the touch screen 30, and when the user touches the portion of the touch screen 30 outside of the frame 200, the size of the displayed subway line map increases on the touch screen 30.

Figure 8:
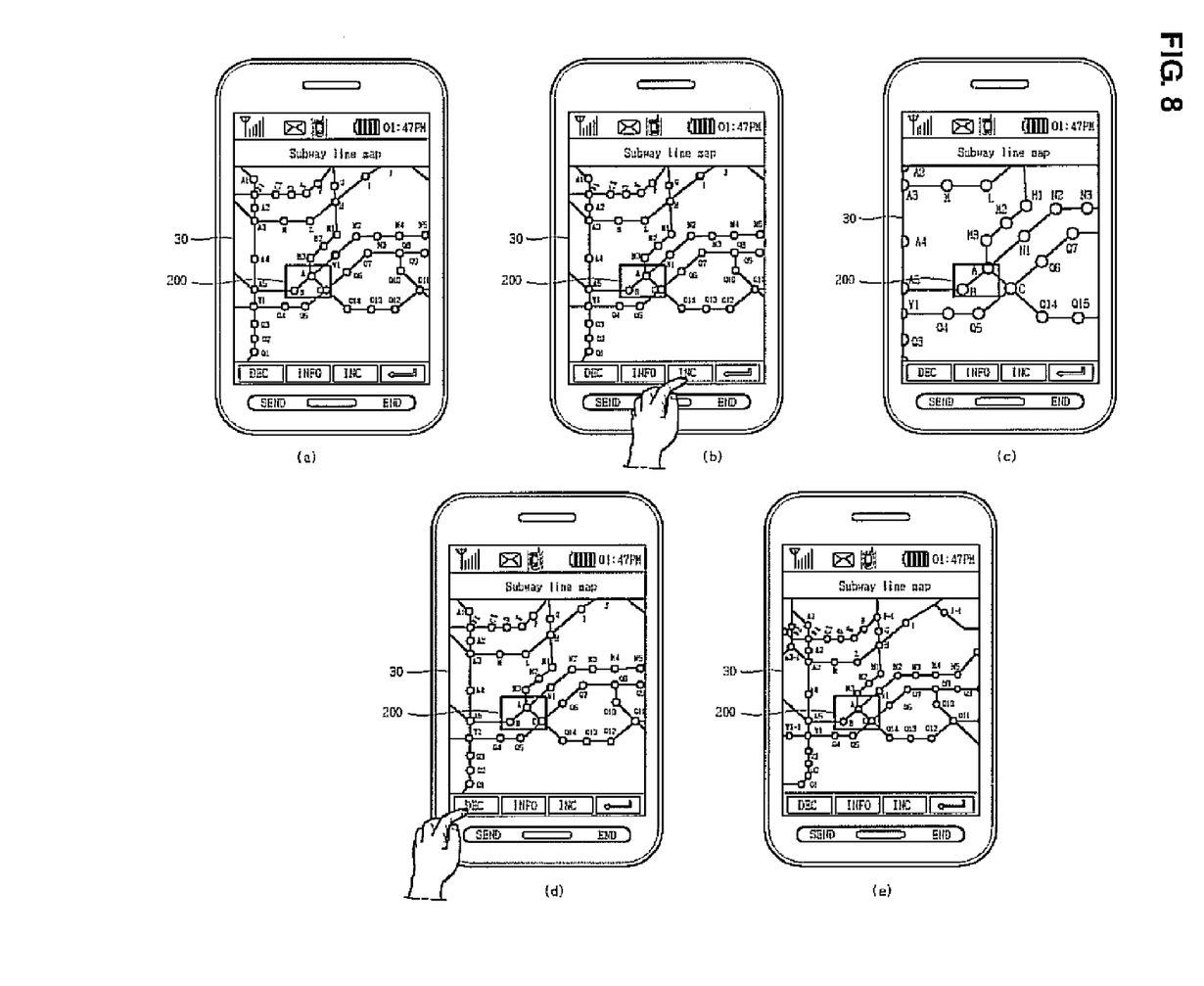
FIGS. 8(a)-8(e) illustrate enlarging or downsizing data using scale up/down menus displayed on a touch screen in accordance with one embodiment of the present invention.

FIGS. 8(a)-8(e) illustrate increasing or decreasing a size of data using scale up/down menus displayed on a touch screen in accordance with one embodiment of the present invention. Referring to FIG. 8(a), soft menus, such as menus for increasing and decreasing a data size, the subway line map and the frame 200 are displayed on the touch screen 30. Referring to FIGS. 8(b) and 8(c), when the user touches the menu for increasing the data size on the touch screen 30, the size of the displayed subway line map increases on the touch screen 30. Referring to FIGS. 8(d) and 8(e) of FIG. 8, when the user touches the menu for decreasing the data size on the touch screen 30, the size of the displayed subway line map decreases on the touch screen 30.

FIGS. 9(a)-9(e) illustrate increasing or decreasing a data size using scale up/down icons displayed on a touch screen in accordance with one embodiment of the present invention. Referring to FIG. 9(a), icons 220 and 230 for respectively increasing and decreasing a data size, the subway line map and the frame 200 are displayed on the touch screen 30.

Figure 9:
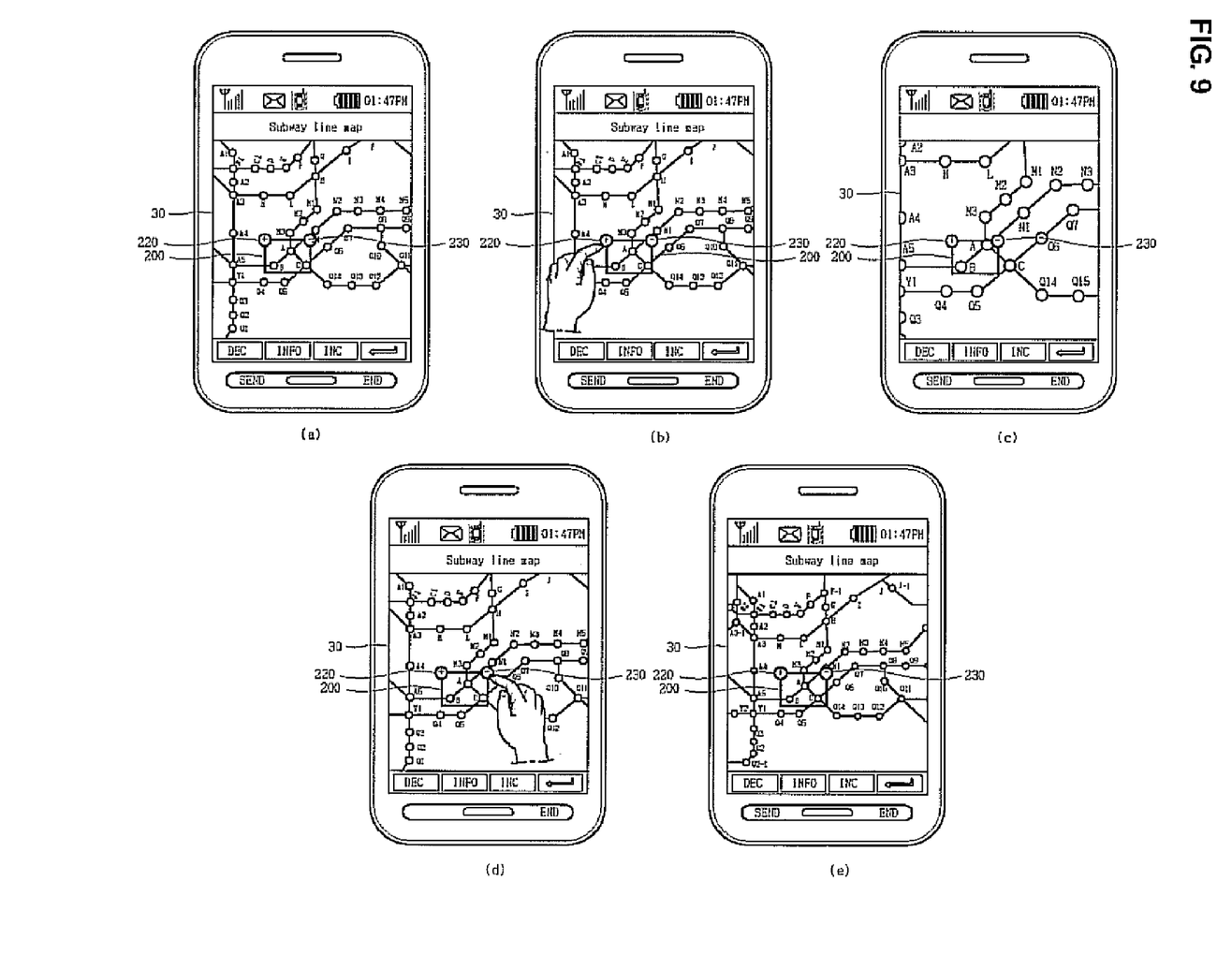
FIGS. 9(a)-9(e) illustrate enlarging or downsizing data using scale up/down icons displayed on a touch screen in accordance with one embodiment of the present invention.

Referring to FIGS. 9(b) and 9(c) of FIG. 9, when the user touches the icon 220 on the touch screen 30, the size of the displayed subway line map increases on the touch screen 30. Referring to FIGS. 9(d) and 9(e), when the user touches the icon 230 on the touch screen 30, the size of the displayed subway line map decreases on the touch screen 30.

Additionally, the size of the displayed subway line map may be increased or decreased using up and down side keys located at a side of the mobile terminal 100. For example, when the user presses the up side key, the size of the displayed subway line map increases on the screen 30. Accordingly, when the user presses the down side key, the size of the displayed subway line map decreases on the screen 30.

As described above, the user is able to increase and/or decrease the size of the entire subway line map. However, the present invention is not limited thereto. In one aspect of the invention, when either the area inside or outside of the frame 200, one of the soft menus, one of the icons 220 and 230, or one of the up/down side keys is pressed, a size of only a portion of the subway line map inside the frame 200 is increased or decreased on the touch screen 30 instead of the entire subway line map. Thus, when the size of the subway line map data inside the frame 200 increases or decreases, the size of the frame 200 also increases or decreases accordingly.

Figure 10:
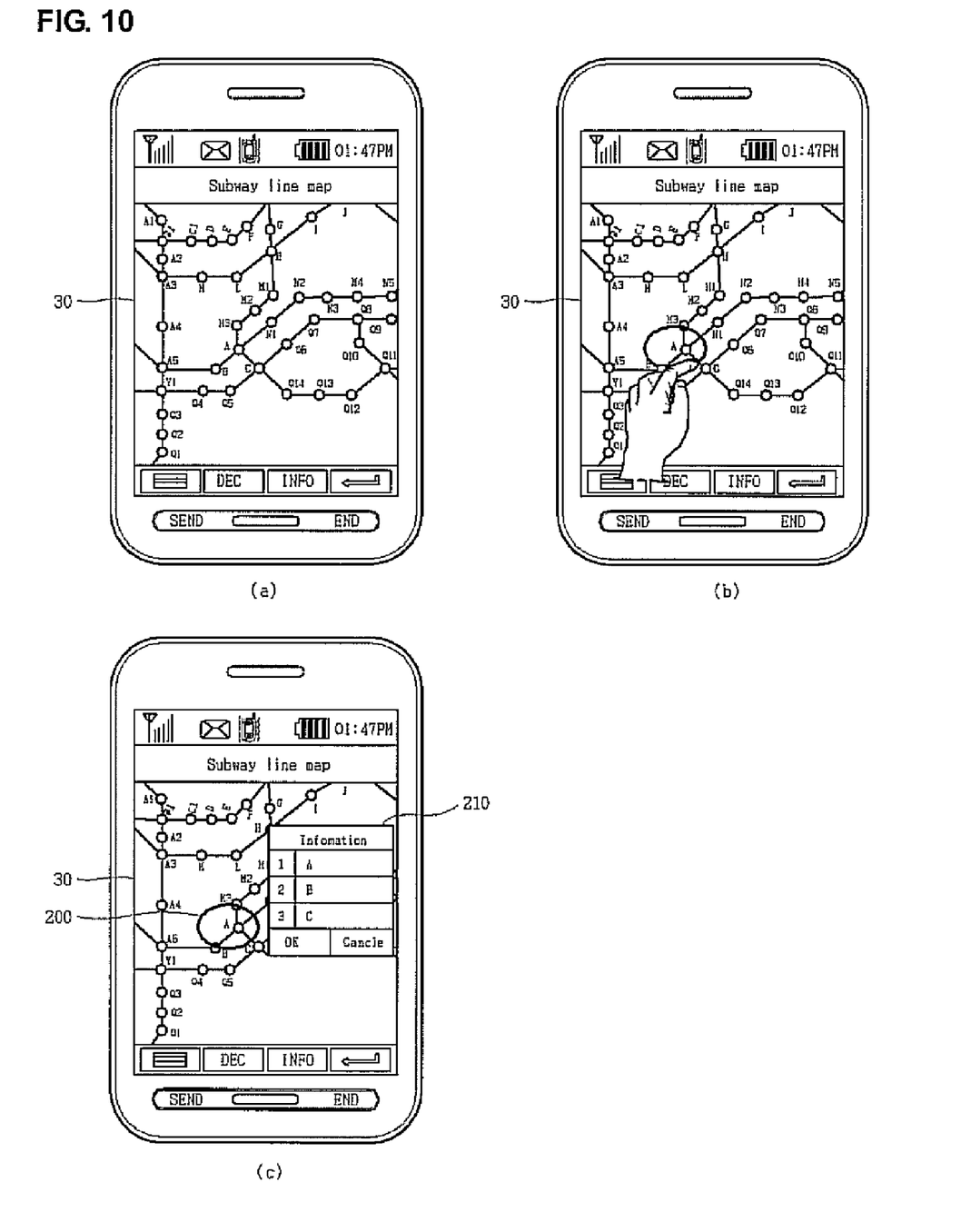
FIGS. 10(a)-10(c) are drawings for explaining an information display method of a mobile terminal in accordance with another embodiment of the present invention.

In accordance with another embodiment of the present invention, the present invention forms a frame on the touch screen by touching the touch screen. FIGS. 10(a)-10(c) are drawings for explaining an information display method of a mobile terminal in accordance with another embodiment of the present invention.

Referring to FIG. 10(a), if a subway line map display is requested by the user to search a subway line, the subway line map is displayed on the touch screen 30 of the mobile terminal 100. Notably, FIG. 10(a) is different from the previous figures in that a frame is not displayed on the touch screen 30.

In accordance with the present invention, when a user uses his/her finger to touch one position of the displayed subway line map on the touch screen 30, and then moves the finger to another position while maintaining a touched state, an instruction line is displayed on the touch screen 30 following the movement of the user's finger. Preferably, the user may create a substantially closed loop with the instruction line, and therefore form a region or domain on the touch screen 30. Accordingly, the substantially closed loop similarly functions as the frame 200 described in the above embodiments.

Referring to FIGS. 10(b) and 10(c), when the user moves a finger on the touch screen 30 while maintaining the touched state, and forms the substantially closed loop, if the user's finger is released from the touch screen 30, information related to subway stations located inside the substantially closed loop or the frame 200 is displayed near the center of the touch screen 30 in a pop-up window or as a shaded image.

Additionally, after the user's finger is released from the touch screen 30, if the user touches the inside of the frame on the screen 30, information related to the subway line map inside the frame 200 may be displayed, or the size of the subway line map inside the frame may be increased on the touch screen 30. Also, if the user touches an area of the touch screen 30 outside of the frame 200, the size of the frame 200 may be decreased, the frame 200 may be moved to the touched spot, or the size of the subway line map may be decreased on the touch screen.

As described above, the frame 200 is formed when the substantially closed loop is drawn by movement of the users finger. However, the present invention is not limited thereto. For example, when the user touches a position on the touch screen 30, a frame 200 may be generated and displayed around the touched position.

Furthermore, as described above, the data displayed on the touch screen 30 of the mobile terminal 100 relates to a subway line map. However, the present invention is not limited thereto. For example, the data displayed on the touch screen 30 may be one of a bus line map, a train line map, a geographic map, a calendar, an electronic book (e-book), a webpage, an image, a photograph and the like.

In one aspect of the invention, when a calendar and a frame are displayed on the touch screen 30 and the user touches the inside of the frame, information related to a date located inside the frame may be displayed in a pop-up window or as a shaded image. The information related to the date may comprise schedule information or anniversary information, for example, that the user inputs.

In another aspect of the invention, data displayed on the touch screen 30 may be related to an e-book or webpage. Accordingly, if the user touches the inside of a frame, a pop-up window or a shaded image may be displayed on the touch screen to execute a search function, wherein text located inside the frame is used as a basis for the search.

Figure 11:
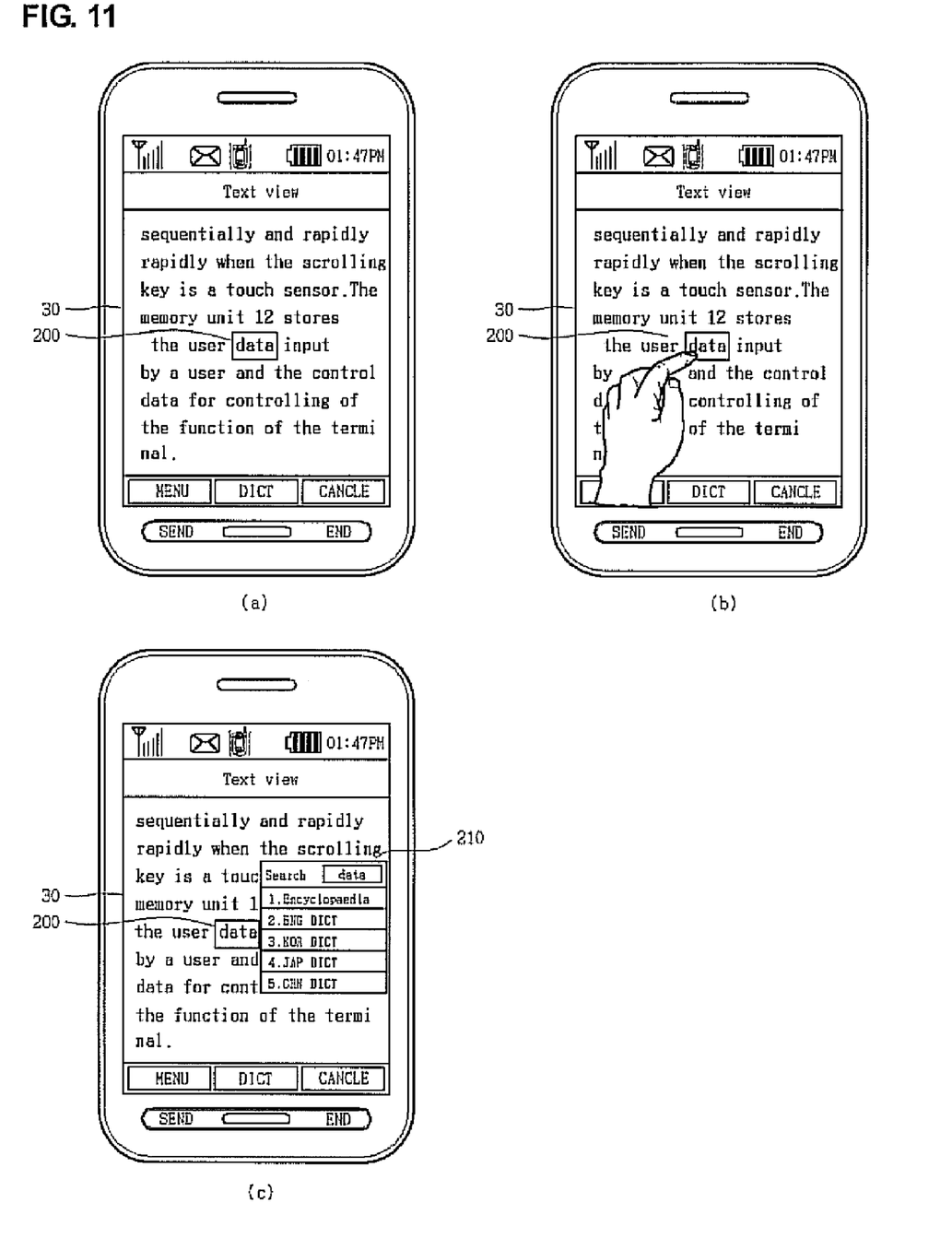
FIGS. 11(a)-11(c) illustrate displaying a pop-up window when a user touches the inside of a frame when data displayed on a touch screen is an e-book in accordance with one embodiment of the present invention.

FIGS. 11(a)-11(c) illustrate displaying a pop-up window when a user touches the inside of a frame when data displayed on a touch screen is an e-book in accordance with one embodiment of the present invention.

Referring to FIG. 11(a), when an e-book display is requested, contents of the e-book are displayed on the touch screen 30. Preferably, a frame 200 surrounding some of the contents is displayed at the same time. Referring to FIGS. 11(b) and 11(c), when some of the e-book contents are inside the frame, and the inside of the frame 200 is touched, a pop-up window 210 or a shaded image is displayed on the touch screen 30 to execute a search function, wherein text located inside the frame is used as a basis for the search.

Preferably, when the user chooses a dictionary menu in the pop-up window 210 as shown in FIG. 11(c), a dictionary search function for the specific text is executed. Notably, although a dictionary search function is described with regard to the above embodiment, the present invention is not limited thereto. Various search methods in addition to the dictionary search function may be used.

Furthermore, although the embodiments are described above respectively and independently, the present invention may comprise the combination of two or more of them.

The embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. A method of controlling a display in a mobile terminal comprising a touch screen having a display area that operates as a touch input area, the method comprising:
   displaying data information including a plurality of data items on the display area; and
   displaying a frame on the display area to partially overlap the data information, the frame having a size,
   wherein the number of data items included in the frame of the plurality of data items is variable according to a location and size of the frame on the data information, and
   wherein when an area inside the frame is touched, a predetermined function associated with the data items displayed in the area inside the frame is performed, the predetermined function comprising displaying detailed information related to the data items included in the frame as a pop-up window on a portion of the display.

2. The method of claim 1, wherein the data information comprises a map and the predetermined function comprises displaying detailed location information.

3. The method of claim 1, wherein the frame comprises one of a polygon and a circularly closed-loop.

4. The method of claim 1, wherein the frame is defined by touching the display area in a manner that forms substantially a closed-loop.

5. The method of claim 1, wherein the frame is displayed in response to a touching of the display area where the data information is displayed.

6. The method of claim 1, wherein when a portion of the display area outside the frame is touched, the data information corresponding to the touched portion is displayed in the frame.

7. A mobile terminal comprising:
   a touch screen having a display area that operates as a touch input area; and
   a controller configured to display data information including a plurality of data items on the display area and to display a frame on the display area to partially overlap the data information, the frame having a size,
   wherein the number of data items included in the frame of the plurality of data items is variable according to a location and size of the frame on the data information,
   wherein when an area inside the frame is touched, a predetermined function associated with the data items displayed in the area inside the frame is performed, the predetermined function comprising displaying detailed information related to the data items included in the frame as a pop-up window on a portion of the display,
   wherein when a portion of the display area outside the frame is touched, the data information corresponding to the touched portion is displayed in the frame.

8. The mobile terminal of claim 7, wherein the data information comprises a map and the predetermined function comprises displaying detailed location information.

9. The mobile terminal of claim 7, wherein the frame comprises one of a polygon and a circularly closed-loop.

10. The mobile terminal of claim 7, wherein the frame is defined by touching the display area in a manner that forms substantially a closed-loop.

11. The mobile terminal of claim 7, wherein the frame is displayed in response to a touching of the display area where the data information is displayed.

12. A mobile terminal comprising:
   a touch screen having a display area that operates as a touch input area; and
   a controller configured to receive a request for displaying data information including a plurality of data items on the display area, and display the data information and a frame together on the display area according to the request, the frame having a size,
   wherein the number of data items included in the frame of the plurality of data items is variable according to a location and size of the frame on the data information, wherein the frame is displayed on the display area to partially overlap the data information, and wherein when an area inside the frame is touched, a predetermined function associated with the data items displayed in the area inside the frame is performed, the predetermined function comprising displaying detailed information related to the at least one data item included in the frame as a pop-up window.

13. The mobile terminal of claim 12, wherein the at least one data item comprises at least one of map item, calendar item, electronic book item, webpage item or image item.

* * * * *